(12) United States Patent
Bengoa et al.

(10) Patent No.: US 6,857,636 B2
(45) Date of Patent: Feb. 22, 2005

(54) SHAFT SEALING RING

(75) Inventors: Jesus Bengoa, Durango (ES); Antonio Gorrino, Eibar (ES); Gerd Upper, Hoisdorf (DE)

(73) Assignee: Dichtungstechnik G. Bruss GmbH & Co. KG, Hamburg (DE)

( * ) Notice: Subject to any disclaimer, the term of this patent is extended or adjusted under 35 U.S.C. 154(b) by 0 days.

(21) Appl. No.: 10/441,208

(22) Filed: May 20, 2003

(65) Prior Publication Data

US 2003/0230852 A1 Dec. 18, 2003

(30) Foreign Application Priority Data

May 21, 2002 (DE) .......................................... 102 22 418

(51) Int. Cl.$^7$ ............................................... F16J 15/32
(52) U.S. Cl. ........................ 277/549; 277/559; 277/560
(58) Field of Search ................................ 277/549, 559, 277/560

(56) References Cited

U.S. PATENT DOCUMENTS

| | | | |
|---|---|---|---|
| 3,640,542 A | * | 2/1972 | Mowat et al. .............. 277/559 |
| 3,868,105 A | | 2/1975 | Bentley |
| 4,441,722 A | | 4/1984 | Pichler |
| 5,190,299 A | * | 3/1993 | Johnston ..................... 277/559 |
| 5,711,534 A | * | 1/1998 | Bengoa et al. .............. 277/559 |

FOREIGN PATENT DOCUMENTS

EP         0 094 063          11/1983

* cited by examiner

Primary Examiner—Alison Pickard
Assistant Examiner—Enoch Peavey
(74) Attorney, Agent, or Firm—Duane Morris LLP

(57) ABSTRACT

A shaft sealing ring, comprising an elastic sealing lip which has a sealing edge in engagement with a circumferential surface of a shaft which rotates relative to the shaft sealing ring, further comprising at least two sinusoidally curved helical elements having the same amplitudes and wavelengths which are provided on a sealing lip surface facing the surroundings and serve to convey medium that has escaped to the side of the surroundings back over the sealing edge to the side of the medium of the shaft sealing ring, the helical elements being arranged phase-shifted with respect to each other in circumferential direction and merging tangentially in circumferential direction into the sealing edge is characterized in that the ratio between the wavelength L and the amplitude A of the sinusoidally curved helical elements fulfills the relationship

15 Claims, 3 Drawing Sheets

SHAFT SEALING RING

The instant invention relates to a shaft sealing ring, comprising an elastic sealing lip which has a sealing edge in engagement with a circumferential surface of a shaft which rotates relative to the shaft sealing ring, further comprising two sinusoidally curved helical elements of equal amplitudes and wavelengths which are provided on a sealing lip surface facing the surroundings and serve to convey medium that has escaped to the side of the surroundings back over the sealing edge to the side of the medium of the shaft sealing ring, the helical elements being phase-shifted with respect to each other in circumferential direction and merging tangentially in circumferential direction into the sealing edge.

A shaft sealing ring of this kind is known from DE 44 43 422 C2. The two continuous, sinusoidally curved helical elements are arranged in braid fashion, shifted in phase by 180° at the side facing the surroundings of the elastic sealing lip and adjacent the sealing edge thereof. The helical elements convey medium which has escaped to the side of the surroundings back to the side of the medium of the shaft sealing ring over the sealing edge.

With such a shafting sealing ring, the conveying performance, measured in milliliters per minute, is considered to be a measure of the quality of the sealing effect: a high back or return conveying value indicates good sealing efficiency.

It is an object of the invention to optimize the back conveying performance of a shaft sealing ring of the kind described above.

To meet this object, it is provided in accordance with the invention that the relationship between the wavelength L and the amplitude A of the sinusoidally curved helical elements lies in the range of $12.5 < L/A < 90$.

The nucleus of the invention is to be seen in the finding that the quotient L/A of wavelength L and amplitude A of the sinusoidal curve followed by the helical elements represents a characteristic factor of similarity which comprises the following dimensioning rule for the sinusoidal curve:

make the wavelength greater and/or the amplitude smaller within the range indicated if you want to get better conveying results.

Irrespective of the concrete dimensions, this dimensioning rule applies to any contact range for which a specific conveying value in milliliters per revolution (ml/U), depending on the selection of L/A, is obtained for each individual contact area of the helical elements. The product of the number of contact areas of the helical elements multiplied with the sealing edge provides the conveying value of the entire shaft sealing ring.

As for manufacturing reasons the reduction of the amplitude A is subject to limits, the characteristic factor of similitude L/A in practice is achieved by the selection of great wavelengths L. To reach the highest possible conveying value, the greatest possible number of contact areas of the helical elements with the shaft, having the greatest possible L/A value, must to be arranged on the periphery of the sealing lip facing the surroundings. A great value L and, at the same time, a great number of contact areas can be achieved by disposing the helical elements in more than two superimposed sinusoidal curves, especially on three or more sinusoidally arched curves of the same amplitudes and wavelengths in circumferential direction and with the same phase-shift with respect to each other.

Advantageously, the helical elements are inclined with respect to the shaft surface at a negative angle a, starting from the sealing edge towards the side of the surroundings. That will provide increasing contact pressure from the sealing edge towards the free end of the helical element. Thus the contact pressure rises, starting from the sealing edge and along the helical element up to the free end of that element so that the leakage liquid caught by the helical element will have no other choice but to flow off along the path of the lowest hydraulic resistance, and that is over the sealing edge and back into the space to be sealed off at the side of the medium.

Experiments have demonstrated that further increase of the conveying performance can be obtained by having the helical elements merge tangentially without a step into a rounded portion of the sealing edge, as seen in axial direction.

A modification including so-called "helical movement reversal" is preferred for applications where a shaft, in operation, rotates alternatingly in one or the opposite direction of rotation, like the primary shaft of a differential gear of a commercial vehicle. Such helical movement reversal is obtained by designing the partial sections symmetrically, as seen in circumferential direction, with respect to the apices or tangent points lying on the sealing edge, whereby the return conveying performance is approximately the same for both directions of rotation. In this case the preferred L/A ratio between the wavelength L and the amplitude A is in the range of $35 < L/A < 75$, especially $40 < L/A < 60$.

With the preferred solution for applications where the shaft, in operation, rotates in a preferential direction of rotation and only rarely in the opposite direction, the partial sections, as seen in circumferential direction, are designed asymmetrically with respect to their apices located on the sealing edge, so as to include two different parts which are oriented in opposite directions from the apex, whereby a better conveying performance is achieved in the preferred direction of rotation. In this case the preferred L/A ratio between the wavelength L and the amplitude A of that part of each partial section which is oriented from the apex contrary to the preferred direction of rotation lies in the range of $12.5 < L/A < 25$ and that of the other part which is oriented from the apex in the preferred direction of rotation lies in the range of $40 < L/A < 60$.

Typical examples of operation with a preferred direction of rotation, in a customary road vehicle, are the shaft sealing rings for the output of the gear shift mechanism or the input into the differential gear mechanism.

When using the asymmetric partial sections, as described above, a distinctly higher return conveying performance can be obtained in the preferred direction of rotation because more helical elements can be accommodated on the circumference than with a symmetrical design, due to the shorter length of the parts which are oriented in the preferred direction of rotation. However, it is a requirement that the asymmetric and the symmetric partial sections be designed in accordance with the dimensioning rules of the invention.

Manufacturing can be simplified if the apex areas of the sinusoidally curved helical elements are approximated by a "best fit" circular arc. It was found, according to the invention, that this measure has no noticeable disadvantageous influence on the feed value.

The invention will be described further, by way of example, with reference to the accompanying drawings, in which.

Figure 1:
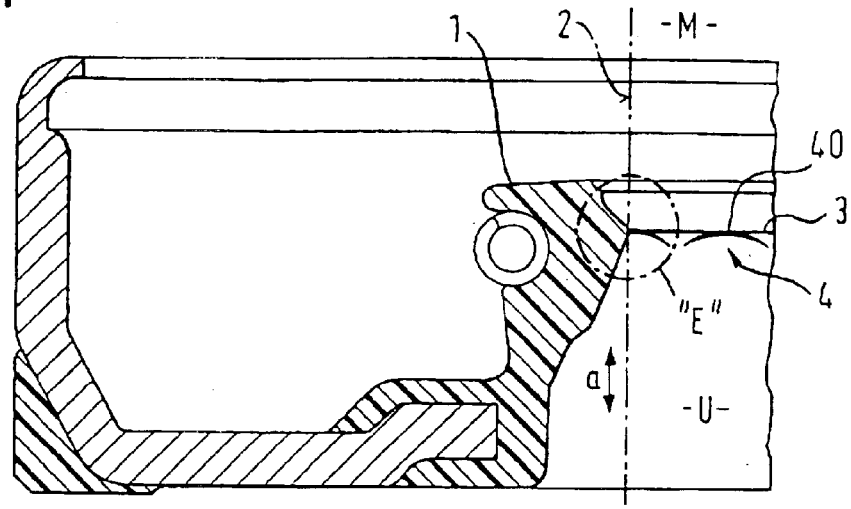
FIG. 1 is a part sectional elevation of a shaft sealing ring according to the invention, having the helical elements designed for helical reversal.
Figure 8:
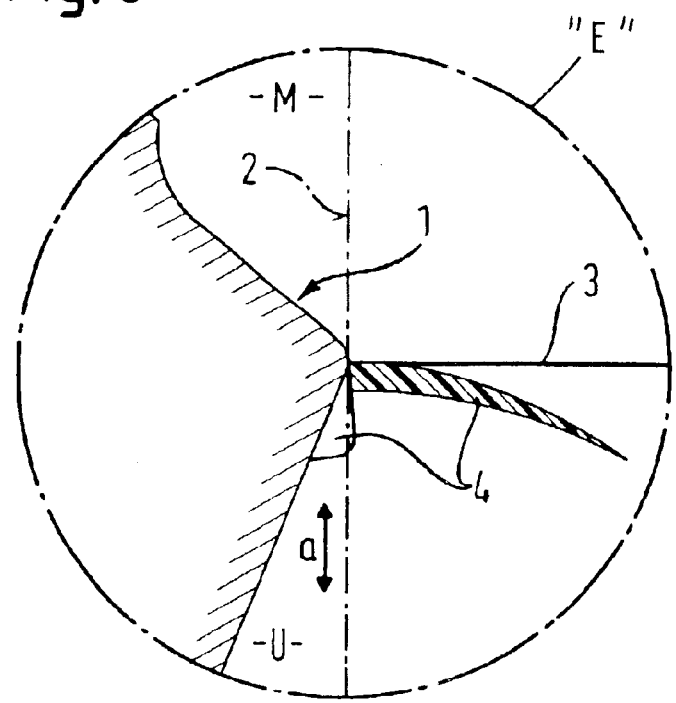
FIG. 8 shows a detail E of FIG. 1 or FIG. 6, on an enlarged scale.

FIG. 1 shows a partial cross section of a radial shaft sealing ring having a sealing lip 1 of which a sealing edge 3 engages the surface 2 of a shaft, indicated in dash dot line. Helical elements 4 are provided on the sealing edge 3 at the side facing the surroundings U. In operation the helical elements, too, enter into sealing contact with the surface 2 of the shaft. That is illustrated more specifically in the developed partial imprint of part of the sealing edge 3 and some of the helical elements 4. Thus it may be seen that the helical elements lie snuggly tangentially against the sealing edge, as seen in circumferential direction u, touching it at the apex 40, that is the tangent point. It may be seen in the enlarged illustrations of FIGS. 8 and 9 that the sealing lip 1 is rounded with a radius r and that the helical element 4 merges stepless and tangentially in axial direction a into this rounded portion. By virtue of this rounding and the inclination of the flanks of the sealing lip a theoretical sealing edge 3' is formed at a spacing b from the sealing edge, the size of this spacing being determined by the intersection of the flanks.

Figure 9:
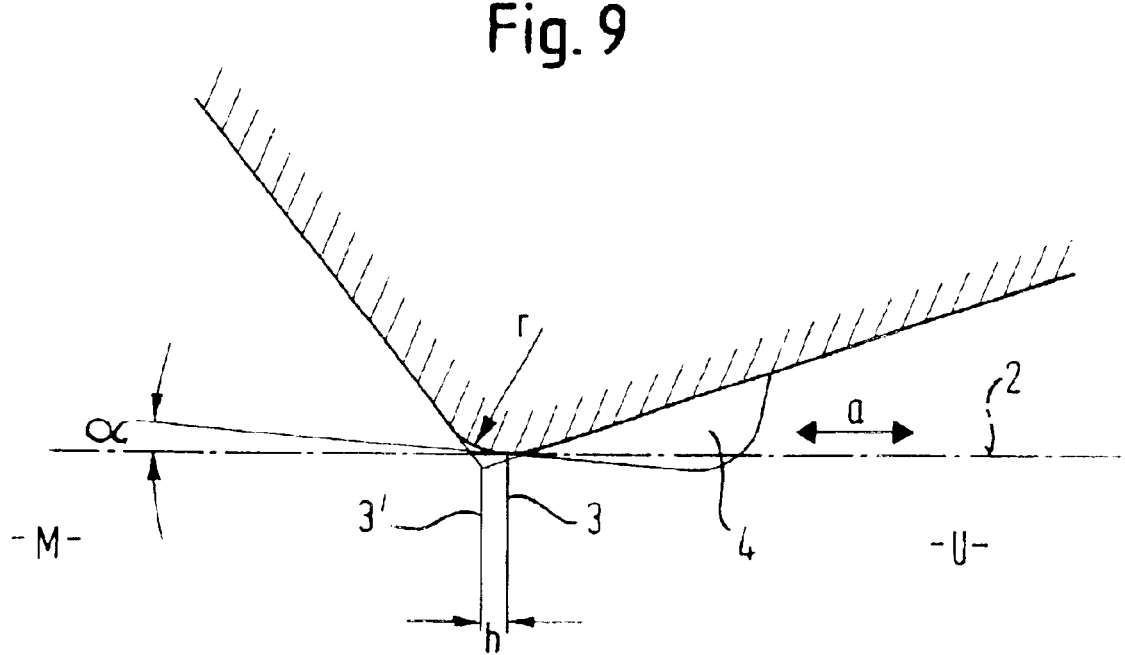
FIG. 9 is a mirror inverted presentation, rotated through 90°, of a detail in the area of the sealing edge as shown in FIG. 8, on an even greater scale.

As may be taken from FIG. 9, each helical element 4 is inclined with respect to the shaft surface 2 towards the side of the surroundings U at a negative angle α, preferably of a size between −2° and +4°. As a result of this design the contact pressure of the helical elements 4 rises in the direction towards the side U of the surroundings, as compared to the contact pressure which prevails at the sealing edge 3 itself. Therefore, at their ends which are farthest from the sealing edge 3, the helical elements 4 press against the surface 2 of the shaft with great contact pressure, thereby ensuring sealing engagement with this surface.

Figure 2:
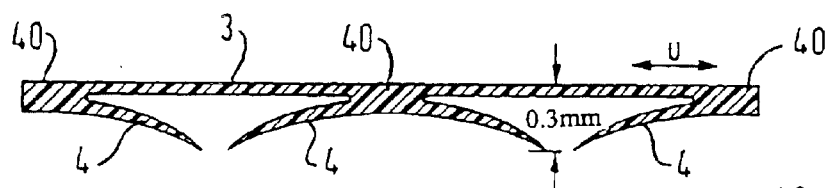
FIG. 2 is an imprint of the developed wave of a sealing edge and of a plurality of helical elements of a shaft sealing ring as shown in FIG. 1, on an enlarged scale.
Figure 2A:
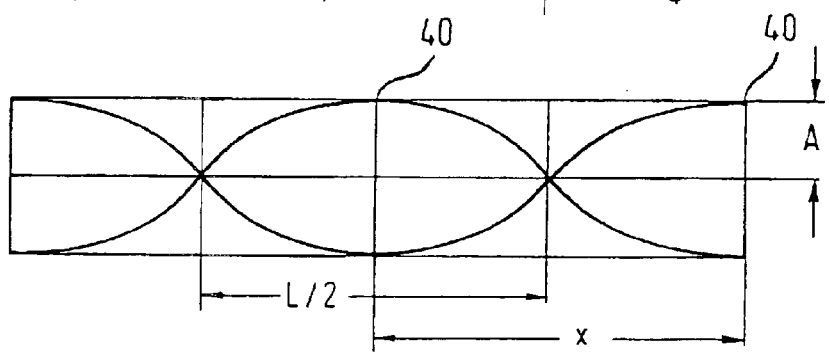
FIG. 2a is a schematic diagram, in partial development, of two superimposed sinusoidal curves which the helical elements shown in FIG. 1 follow.

FIG. 2a illustrates that the helical elements 4 according to FIGS. 1 and 2 are located on two superimposed sine curves of wavelength L and amplitude A, with respective adjacent helical elements in circumferential direction u lying on the respective other one of the sine curves. The helical elements 4 are separate from each other.

Figure 3:
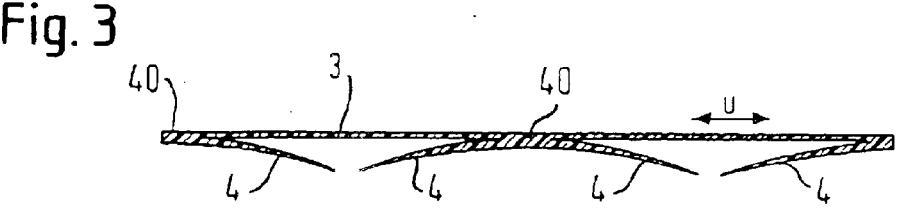
FIG. 3 is an imprint of the developed wave of a sealing edge including modified helical elements of a shaft sealing ring, similar to FIG. 2.
Figure 3A:
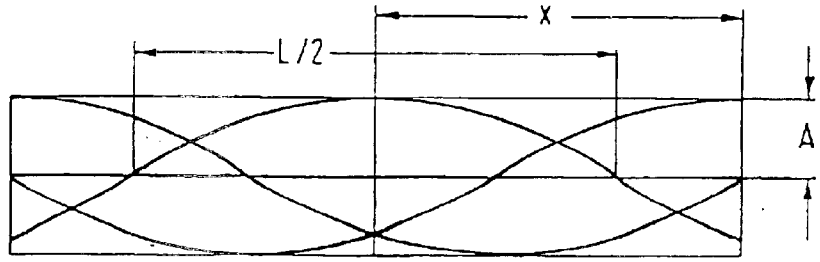
FIG. 3a is a schematic diagram, in partial development, of three superimposed sinusoidal curves which the helical elements shown in FIG. 3 follow.

With the alternative illustrated in FIG. 3, the helical elements 4 lie on three superimposed sine curves having a distinctly greater wavelength L, while the amplitude is the same. And yet, as is the case with the FIG. 2 embodiment, adjacent contact areas of the helical elements, in circumferential direction u, follow at the same spacing x of the apices 40. Therefore, at the same circumferential spacing x of contact areas, the ratio L/A, the so-called characteristic factor of similitude, is greater with the embodiment shown in FIG. 3 than it is with the embodiment of FIG. 2 and, as a consequence, the conveying performance of the shaft sealing ring is higher. In this context, reference is made to the diagram of FIG. 4 which shows the specific feed value in milliliters per revolution per helical element at various rotational speeds. At small ratios L/A the feed value rises slightly up to a value of approximately 20, next, in the range between 20 and 40, it rises steeply and, following that, it again rises at a smaller rate.

Figure 4:
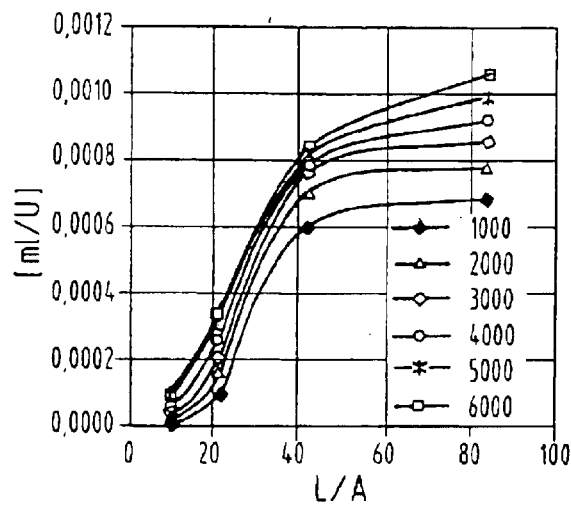
FIG. 4 is a diagram of the specific feed values of a shaft sealing ring according to the invention above the relationship L/A between the wavelength L and amplitude A of a sine curve according to FIG. 3, for six different rotational speeds.
Figure 5:
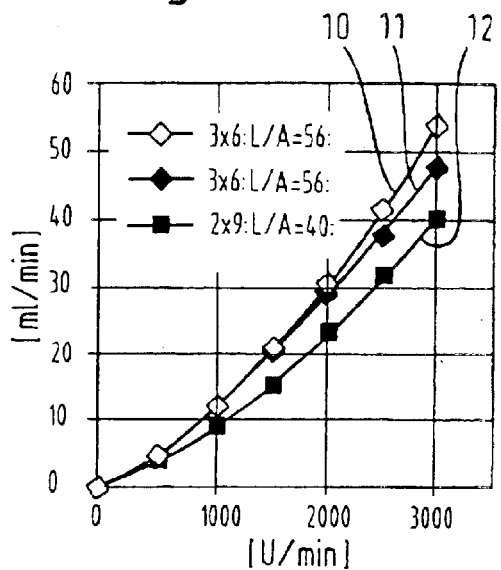
FIG. 5 is a diagram of the conveying values of a shaft sealing ring according to the invention above the rotational speed for different embodiments of the helical elements.

The total conveying performance of the radial shaft sealing ring is calculated by multiplying the number of helical elements with the specific conveying value according to FIG. 4. FIG. 5 illustrates this conveying value in milliliters per minute above the rotational speed (r.p.m.) for different configurations of the helical elements 4. The helical elements having a conveying performance in accordance with the topmost curve 10 in FIG. 3 formed separate parts and were arranged in a number of altogether six contact areas per sine line around the circumference of the radial shaft sealing ring, their ratio L/A being 56. If these helical elements, which otherwise were the same in structure, were arranged with their contact areas in continuous alignment, in other words not forming separate parts, the conveying performance corresponded to curve 11 in the middle. A conveying performance according to the lowermost curve 12 was obtained with a configuration as shown in FIG. 2 when the helical elements were disposed on only two sine lines but likewise were continuous, by contrast, and a total of nine contact areas per sine line was established, the ratio L/A being 40.

Better conveying results thus can be obtained if
  the characteristic factor of similitude L/A is great;
  the helical elements are arranged on three or more superimposed sine curves;
  the helical elements are designed as separate parts having contact areas shaped like convex arches whose apices 40 coincide with the tangent points with the sealing edge 3.

Figure 6:
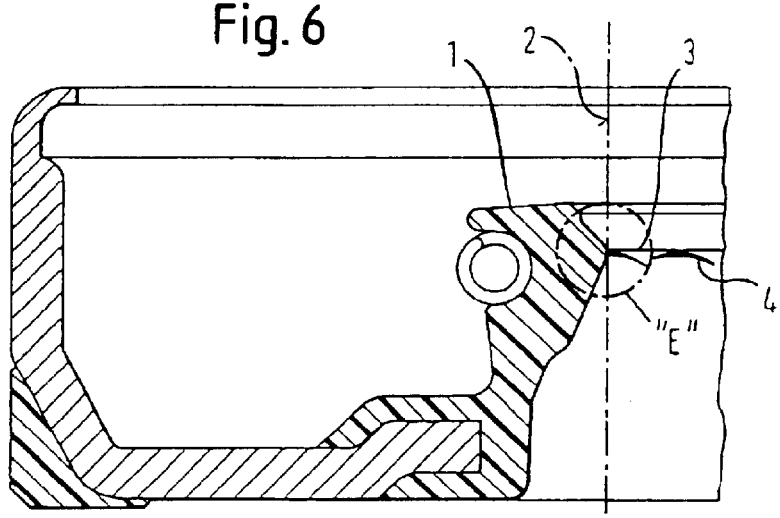
FIG. 6 is a part sectional elevation of a shaft sealing ring according to the invention, having the helical elements designed for a preferred direction of rotation.

FIG. 6 illustrates a second embodiment of a shaft sealing ring with a preferential direction of rotation v or a so-called "single acting helical effect".

Figure 7:
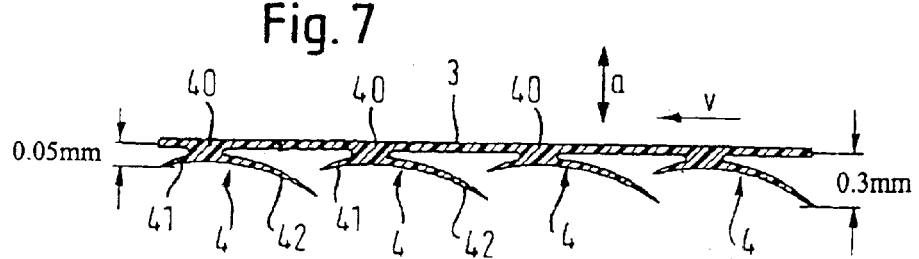
FIG. 7 is an imprint of the developed wave similar to FIG. 2 of a sealing edge, including helical elements according to FIG. 6.

FIGS. 6 and 7 show that the helical elements 4, when seen in imprint or plane projection, are shaped like airfoils, having two parts 41 and 42 which are oriented in opposite directions from the apex 40. The apex 40 coincides with the tangent point of the helical elements 4 on the sealing edge 3. The characteristic factor of similarity of part 41 is L/A=20, while that of part 42 is L/A=>>40. The length of part 42 is selected so that a sufficiently large catching cross section for any leakage will be left even after a long running time and in spite of wear in the running track. This length results from an axial stroke of at least 0.3 mm of the cutting tool for cutting the recesses for forming the parts 42 in a mold. The shorter length of the part 41 results from an axial stroke of at least 0.05 mm of the cutting tool for cutting the recesses for forming the parts 48 in the mold. This shorter length is just long enough to still assure sufficient conveyance of the medium flow back to the side M of the medium over the sealing edge 3 in order to avoid leaking outwardly of the medium when the rotation is contrary to the preferred direction v of rotation.

The features disclosed in the specification above, in the figures and claims may be essential to implementing the invention in its various embodiments, both individually and in any combination.

What is claimed is:

1. A shaft sealing ring, comprising an elastic sealing lip (1) which has a sealing edge (3) in contact with a circumferential surface (2) of a shaft which rotates relative to the shaft sealing ring, further comprising at least two sinusoidally curved helical elements (4) having same amplitudes and wavelengths which are provided on a sealing lip surface facing the surroundings and serve to convey medium that has escaped to the side of the surroundings (U) back over the sealing edge (3) to the side of the medium (M) of the shaft sealing ring, the helical elements (4) being phase-shifted with respect to each other in circumferential direction (u) and merging tangentially in circumferential direction into the sealing edge, characterized in that the ratio between the wavelength L and the amplitude A of the sinusoidally curved helical elements (4) fulfills the relationship $$12.5 < L/A < 90$$

and as seen in axial direction (a), the helical elements (4) merge tangentially into a rounded portion (r) of the sealing edge.

2. The shaft sealing ring as claimed in claim 1, characterized in that in the expanded state of the shaft sealing ring to the shaft diameter, the helical elements (4) are inclined from the sealing edge (3) towards the side of the surroundings (U), at an helix angle α with respect to the shaft surface which is in the range form $0° > α > -5°$.

3. The shaft sealing ring of claim 2 wherein the helix angle α with respect to the shaft surface is in the range of $-2° > α > -4°$.

4. The shaft sealing ring as claimed in claim 1, characterized in that at least three sinusoidally curved helical elements (4) having the same amplitudes and wavelengths are disposed at the same phase shift with respect to each other in circumferential direction.

5. The shaft sealing ring as claimed in claim 1, characterized in that the sinusoidally curved helical elements (4) comprise groups of convex partial sections facing the sealing edge, each extending along a continuous sine line and having their apices (40) on the sealing edge.

6. The shaft sealing ring as claimed in claim 5, characterized in that each helical element, as seen in an imprint or projection, respectively, on the shaft, is shaped like an airfoil profile.

7. The shaft sealing ring as claimed in claim 5, characterized in that the partial sections of the helical elements consisting of lines-up pieces of at least three sine lines are superimposed in braid fashion.

8. The shaft sealing ring as claimed in claim 5, characterized in that the partial sections of the helical elements consisting of separated pieces of at least three sine lines are superimposed in braid fashion.

9. The shaft sealing ring as claimed in claim 5, characterized in that the partial sections, as seen in circumferential direction, are designed symmetrically with respect to their apices or tangent points (40) located on the sealing edge so that the conveying performance of the helical elements is approximately the same for both directions of rotation.

10. The shaft sealing ring as claimed in claim 9, characterized in that the ratio L/A between the wavelength L and the amplitude A lies in a range of $35 < L/A < 75$.

11. The shaft sealing ring of claim 10 wherein the ratio L/A between the wavelength and the amplitude lies in a range of $40 < L/A < 60$.

12. The shaft sealing ring as claimed in claim 5, characterized in that the partial sections, as seen in circumferential-direction, are designed asymmetrically with respect to their apices (40) located on the sealing edge (3), so as to include two different parts (41, 42) which are oriented in opposite directions from the apex (40) so that the conveying performance achieved in a preferred direction of rotation (v) is grater than in the opposite direction of rotation.

13. The shaft sealing ring as claimed in claim 12, characterized in that the ratio L/A between the wavelength L and the amplitude A of one part of each partial section which is oriented from the apex (40) opposite to the preferred direction of rotation (v) lies in a range of $12.5 < L/A < 25$, and that of the other part which is oriented from the apex in the preferred direction of rotation lies in the range of $40 < L/A < 60$.

14. The shaft sealing ring as claimed in claim 12, characterized in that the one part (41) projects axially beyond the continuous contact band of the sealing edge by at least 0.05 mm, as seen in an imprint or projection, respectively, on the shaft, while the other part (42) projects axially by at least 0.15 mm.

15. The shaft sealing ring as claimed in claim 1, characterized in that the apex areas of the sinusoidally curved helical elements are approximated by a circular arc.

* * * * *